(12) United States Patent
Duvall (10) Patent No.: US 9,021,938 B2
(45) Date of Patent: May 5, 2015

(54) SYSTEM AND METHOD FOR BREWING BEVERAGES

(76) Inventor: Gideon Duvall, Boca Raton, FL (US)

( * ) Notice: Subject to any disclaimer, the term of this patent is extended or adjusted under 35 U.S.C. 154(b) by 1546 days.

(21) Appl. No.: 12/180,177

(22) Filed: Jul. 25, 2008

(65) Prior Publication Data

US 2010/0018405 A1    Jan. 28, 2010

(51) Int. Cl.
*A47J 31/34* (2006.01)
*A47J 31/06* (2006.01)
*A47J 31/22* (2006.01)

(52) U.S. Cl.
CPC .............. *A47J 31/0647* (2013.01); *A47J 31/22* (2013.01)

(58) Field of Classification Search
USPC .......................................... 99/299
See application file for complete search history.

(56) References Cited

U.S. PATENT DOCUMENTS

| 3,590,723 | A | * | 7/1971 | Dokos et al. | ................. | 99/289 R |
| 6,453,800 | B1 | * | 9/2002 | Chen | ........................... | 99/289 R |
| 2006/0156928 | A1 | * | 7/2006 | Wang | ............................... | 99/280 |
| 2007/0051248 | A1 | | 3/2007 | Lee et al. | | |
| 2011/0088560 | A1 | * | 4/2011 | Nosler et al. | ..................... | 99/290 |

FOREIGN PATENT DOCUMENTS

| EP | 0587035 A1 | 3/1994 |
| EP | 0613646 A1 | 9/1994 |
| EP | 1796517 B1 | 1/2008 |

OTHER PUBLICATIONS

International Search Report/Written Opinion in International Application No. PCT/US2009/051723, mailed Mar. 11, 2010, 7 pages.

* cited by examiner

*Primary Examiner* — Raeann Gorden
(74) *Attorney, Agent, or Firm* — The Concept Law Group, P.A.; Scott D. Smiley; Mark C. Johnson (57) ABSTRACT

A system and method for brewing beverages utilizing inertial separation and an adjustable-volume brewing chamber to selectively retain or release particulate matter, oils, and/or other components of the brewed beverage, whereby mechanical filtration may be avoided and smaller particulates may be separated from the beverage. Thus, less material is needed to achieve similar levels of infusion and brewing time may be reduced.

19 Claims, 6 Drawing Sheets

SYSTEM AND METHOD FOR BREWING BEVERAGES

TECHNICAL FIELD

The present disclosure relates generally to food and beverages, and more particularly to a system and method for brewing beverages.

BACKGROUND OF THE INVENTION

Although coffee beans have been cultivated for use in making beverages for a millennium or more, and tea leaves for much longer, there are surprisingly few methods available for producing beverages from such crops. For tea, the conventional brewing methodology involves steeping the leaves in hot water, with or without a separation element, such as a screen or paper filter. For coffee, more techniques are known, but nearly all include a similar mechanical separation means. The only methods of brewing coffee or tea that omit a filter or screen produce a beverage containing gross particulate matter; "Turkish" coffee is an example. Especially for coffee beverages, where avoidance of such gross particulate matter during consumption is nearly impossible, and where such particulate matter is undesirable, one is forced to employ a mechanical separation means, such as discussed above, along with disadvantages attendant thereto. This explains the prevalence of brewing methods utilizing a mechanical separation element of one form or another.

Nevertheless, use of such mechanical separation elements is likewise problematic. Perhaps the most important detriment associated with mechanical separation of particulate matter is the undesirable affect on taste caused by interaction of the separation element with the beverage. This effect is most pronounced with use of paper filters, and is caused both by chemicals in the paper, as well as by absorption by the porous paper of oils and other flavor or aroma-providing compounds and dissolved particles. The alternative, metallic filters, may similarly and adversely affect the taste of the finished beverage, especially when not properly or adequately cleaned. A metallic taste or a stale flavor may be imparted to the beverage by such a filter, and metallic filters may also remove flavorful and/or aromatic compounds from the finished beverage.

Additionally, many forms of mechanical separation, whether paper, metal or another material, involve passage of the brewed beverage through particulate matter collected at the separation element, wherein oils and/or other organic compounds or materials may be absorbed or re-absorbed by the collected particulate matter. An illustrative example is drip brewing, wherein the brewed coffee is filtered by gravity not only through a metal or paper liner of the brewing chamber, but also through the settled coffee grounds. As the oils and other flavorful and/or aromatic compounds or dissolved particles pass through the coffee grounds, re-absorption by the grounds may occur. Moreover, remaining portions that successfully pass through the grounds may then further be altered, absorbed, or trapped, at least in part, by the liner.

As such, it is clear that there is an unmet need for a system and method for brewing beverages that separates unwanted gross particulate matter from the finished beverage, and that, without use of mechanical filtration or separation means, avoids adverse impact on the taste of the beverage and allows oils and other flavor-providing compounds and dissolved particles to remain in the finished beverage.

BRIEF SUMMARY OF THE INVENTION

Briefly described, in a preferred embodiment, the device and method of the present disclosure overcome the above-mentioned disadvantages and meets the recognized need for such a system and method by providing a beverage brewing system and method utilizing inertial separation of gross particulate matter.

More specifically, a brewing system according to the present disclosure includes a rotatable brewing chamber and a drain or outlet operable therewith. A beverage may be prepared by combination in the rotatable brewing chamber of a substance along with a liquid to be infused by the substance, separation of the beverage from undesired particulate matter by selective rotation of the brewing chamber, and evacuation of the beverage via the drain or outlet.

The rotatable chamber is preferably formed as a cylinder or drum, and may be driven by an appropriate prime mover, such as an electric motor, a hydraulic or pneumatic motor, a hand crank, or the like. The rate of rotation of the chamber is preferably controllable to selectively separate particles and compounds at or above a selected density or particle size. A movable lid or cover is preferably further included to prevent liquid and/or particulate matter from escaping the brewing chamber during rotation. Depression of the lid or cover into the brewing chamber preferably reduces a volume thereof, whereby evacuation of the beverage may be facilitated. A selectively-sealable drain aperture is preferably provided through the wall of the brewing chamber proximate an axis of rotation thereof, and is preferably in communication with a spout or other fluid conducting or storage means to allow the beverage to be dispensed.

Rotation of the brewing chamber preferably causes separation of particulate matter from the liquids, including oils, due to the differing respective densities thereof, wherein coffee grounds, tea leaves, or the like, may accumulate proximate one or more side wall(s) of the chamber during rotation due to inertia and/or a centripetal force provided by the side wall(s). The liquid beverage, including any oils, dissolved particulates, and suspended particulates below a selected density may remain proximate the drain aperture, wherein they may escape therethrough under the force of gravity and/or due to a pressure created by a reduction in the volume of the chamber. During such evacuation of the beverage, the liquids are preferably maintained separate from the gross particulate matter accumulated proximate the walls, whereby oils and other flavorful or aromatic compounds of the like are not removed from the beverage by filtration, absorption, or the like, and are not altered via interaction with such gross particulate matter.

Particles equal to or greater than a selected size or density may preferably be selectively separated by selective control of the rotation rate of the chamber, as well as by selection of the duration of the rotation. Thus, by such selective control, very small particles may be separated from the beverage, including particles smaller than may practically be separated due to pore-size limitations of conventional mechanical separation means. As a result, a finer grind of coffee beans, tea leaves, or the like, may be used in making a beverage with the disclosed device, whereby less coffee, tea, or the like, is necessary to obtain a beverage having the same degree of infusion, or strength of flavor, and whereby a necessary brewing time to make the beverage may be reduced, all without producing a beverage having undesired particulate matter remaining therein.

Particularly, pressurization of the solution resulting from the rotation of the confined beverage aids in the infusion of solution and extraction of flavorful and/or aromatic compounds from the particulate matter. This further enables a decrease in brewing time and/or a decrease in the amount of particulate matter necessary to achieve a similar level of infusion compared to conventional processes.

Accordingly, one feature and advantage of the present system and method is the ability to separate particulate matter from a beverage without a filter or screen, whereby adverse affect on the flavor and/or aroma of the beverage may be avoided.

Another feature and advantage of the present system and method is the ability to increase the yield of oils, other flavorful or aromatic compounds, and/or the like, by maintenance of the separation of particulate matter and such oils, other flavorful or aromatic compounds, and/or the like throughout the dispensing process, whereby separation, retention, absorption, and/or re-absorption of the oils, other flavorful or aromatic compounds, and/or the like may be avoided.

Yet another feature and advantage of the present system and method is the ability to allow use of smaller particulate material in brewing a beverage, thereby reducing a necessary amount of the material and/or reducing brewing times.

A further feature and advantage of the present system and method is the ability to brew a batch of a beverage simultaneously, whereby the entire batch exhibits a consistent flavor throughout.

These and other features and advantages of the system and method of the present disclosure will become more apparent to those ordinarily skilled in the art after reading the following Detailed Description of the Invention and Claims in light of the accompanying drawing Figures.

BRIEF DESCRIPTION OF THE DRAWINGS

Accordingly, the present disclosure will be understood best through consideration of, and with reference to, the following drawing Figures, viewed in conjunction with the Detailed Description of the Invention referring thereto, in which like reference numbers throughout the various Figures designate like structure, and in which.

It is to be noted that the drawings presented are intended solely for the purpose of illustration and that they are, therefore, neither desired nor intended to limit the claimed invention to any or all of the exact details of construction shown, except insofar as they may be deemed essential to the claimed invention.

DETAILED DESCRIPTION OF THE INVENTION

In describing embodiments of the present system illustrated in the Figures, specific terminology is employed for the sake of clarity. The claimed invention, however, is not intended to be limited to the specific terminology so selected, and it is to be understood that each specific element includes all technical equivalents that operate in a similar manner to accomplish a similar purpose.

Figure 1:
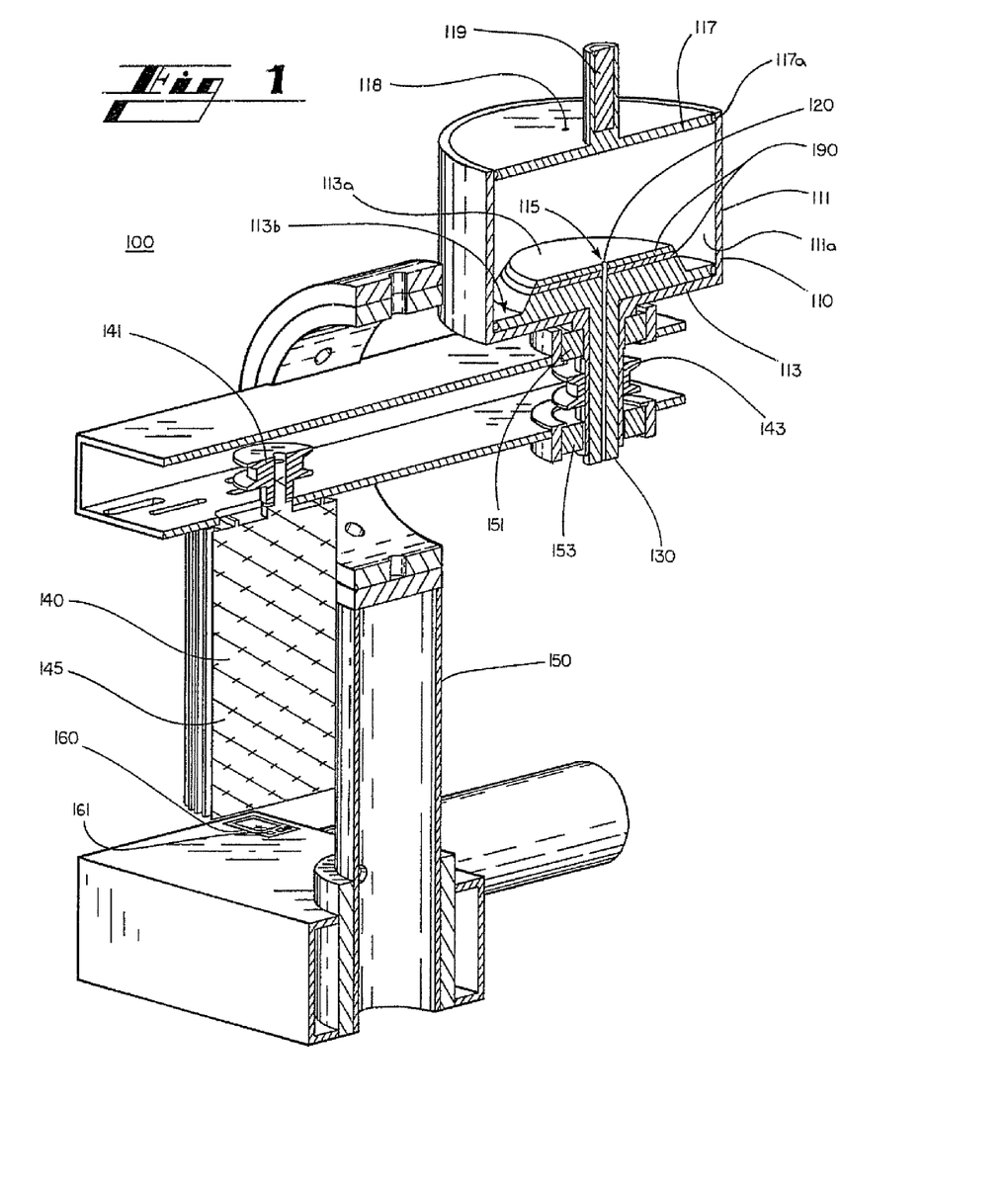
FIG. 1 is a cross-sectional perspective view of an exemplary system for brewing beverages.

In the embodiment chosen for purposes of illustration in FIG. 1, system 100 includes brewing chamber 110, valve 120, spout 130, motor 140, and housing 150. As shown, brewing chamber 110 preferably includes circular side wall 111 and bottom wall 113 sealingly attached to a lower portion of side wall 111. Bottom wall 113 preferably includes central opening 115 operable with valve 120 to selectively seal opening 115. Plunger 117 is preferably further included and is sealingly engageable with an interior surface 111a of side wall 111 to enclose an upper portion of brewing chamber 110.

As will be understood by those ordinarily skilled in the art, brewing chamber 110 may be formed of any suitable material, such as a food-grade plastic, a composite, a metal, or the like. The material should be selected to exhibit beneficial properties, such as high durability, ability to safely contain hot liquids, i.e. boiling or near-boiling water, or the like, corrosion resistance, non-stick surface(s), and the like. Particularly, weight and strength are important considerations because, as discussed in greater detail below, brewing chamber 110 will be rotated during operation, thus a low angular momentum is preferred, and because large forces are exerted on brewing chamber 110 when rotated at high rates; accordingly, metal is a preferred material. Furthermore, brewing chamber 110 is preferably removable from system 100 in order to facilitate cleaning thereof. For example, brewing chamber 110 preferably includes a mechanical fastening means for secure attachment to system 100 during operation, with a biased release means.

Plunger 117 may include one or more sealing element 117a adapted to engage side wall 111, such as a gasket, o-ring, or the like, which preferably provides low-friction engagement of plunger 117 and side wall 111, whereby depression of plunger 117 within side wall 111 is enabled. Such depression of plunger 117 preferably reduces an interior volume of brewing chamber 110, and may be accomplished manually or with a prime mover, such as a screw drive, a piston, or the like. Operable air valve 118 is preferably provided in plunger 117 to allow air to move into and out of brewing chamber 110 during changes in the interior volume thereof, and is preferably closed to prevent escape of the beverage during rotation of brewing chamber 110. Plunger 117 preferably further includes bearing member 119 adapted to receive a depression force. Bearing member 119 is preferably rotatably engaged with plunger 117, whereby rotation between plunger 117 and bearing member 119 is enabled. Thus, a non-rotating element may engage bearing member 119 to apply the depression force while plunger 117 rotates with side wall 111 and bottom wall 113.

Bottom wall 113 may include raised plateau 113a proximate and preferably encircling central opening 115. Thus, as plunger 117 is depressed relative to side wall 111 until abuttingly engaging raised plateau 113a, particulate matter, or the like, may accumulate in well 113b, whereby such particulate matter may not be allowed to exit through central opening 115. As will be understood by those skilled in the art, raised plateau 113a may optionally be omitted, or a raised plateau may be provided on a bottom surface of plunger 117 as an addition to, or as an alternative to, plateau 113a formed on bottom wall 113. Furthermore, plateau 113a and/or a plateau provided on plunger 117 may be formed by removable and stackable shims 190, whereby a volume of well 113b may be adjusted to accommodate greater or lesser quantities of grounds, such as may be required in brewing batches of a beverage of different quantities. For example, each shim 190 may define a well 113b of adequate volume to retain an amount of coffee grounds necessary to brew one cup of coffee. Thus, attachment of additional shims will increase the volume of well 113b to accommodate an amount of coffee grounds necessary to brew a corresponding number of cups of coffee.

Valve 120 is preferably operable to selectively seal central opening 115 of bottom wall 113, whereby liquid may be selectively contained within brewing chamber 110 for use in brewing a beverage. Valve 120 is preferably operable between an open state and a closed state, wherein central opening 115 is sealed when valve 120 is in the closed state. Manipulation of valve 120 to place it in the open state preferably allows a liquid contained in brewing chamber 110 to be evacuated through central opening 115 and dispensed via spout 130. Accordingly, valve 120 preferably includes means for opening and closing, such as a mechanical actuator, an electric actuator, a hydraulic or pneumatic actuator, a magnetic actuator, a pressure actuator, or the like. Preferably, valve 120 includes an inertial switch, or the like, whereby rotation of brewing chamber 110 at or above a predetermined rate causes valve 120 to open and to allow a beverage to be dispensed.

Motor 140 is preferably operable to rotate brewing chamber 110 at a selected rate, such as via sheaves 141, 143 and a belt (not shown), or directly, such as via a frameless motor (discussed in greater detail below with respect to FIGS. 2-3). Thus, motor 140 is preferably an electric motor, but may alternatively be a hydraulic or pneumatic motor, a hand crank, or the like, and is operable to output a driving force sufficient to rotate brewing chamber 110 at the selected rate. As shown in FIG. 1, motor 140 is formed as electric motor 145 having sheave 141 attached to an output shaft thereof. Sheave 143 is preferably fixedly mounted on spout 130, which acts as an axle for rotation of brewing chamber 110. Motor 145 may be securely carried by housing 150, and sheaves 141, 143 are preferably disposed within housing 150, whereby sheaves 141, 143 are protected from damage, and whereby access thereto is restricted. Spout 130 is preferably likewise securely carried by housing 150, such as via bearings 151, 153, whereby spout 130 may rotate relative to housing 150. Bottom wall 113 is preferably fixedly attached to spout 130, whereby rotation of spout 130 by motor 140 preferably causes rotation of brewing chamber 110.

Alternatively, a frameless motor may be provided, whereby sheaves 141, 143 and bearing, 153 may be eliminated. The frameless motor may be carried directly by housing 150 and spout 130 or bottom wall 113 may be attached to a rotor of the frameless motor. In such an embodiment, bearing 151 allows for rotation of brewing chamber 110 relative to housing 150. The compact design of an embodiment including a frameless motor may be preferable for consumer product applications, whereby exterior dimensions of system 100 may be reduced to suit counter-top use.

As will be understood by those ordinarily skilled in the art, controller 160 may be included to control one or more of motor 140, plunger 117, valve 120, and/or other accessory or component, such as a timer, alarm, or the like. Controller 160 is mounted within housing 150 and may be manipulated by a user via one or more buttons 161 accessible from an exterior of housing 150, via a remote control, or the like. Controller 160 is preferably formed as a microprocessor operable to generate control signals to each of motor 140, a prime mover operable to control motion of plunger 117, and valve 120 according to a computer program product stored on a storage medium, an input from a user, such as via a button, or the like.

In use, one or more shim 190 may be attached to plunger 117 and/or to bottom wall 113 to form raised plateau 113a and associated well 113b adapted to collect and retain a predetermined amount of coffee grounds and/or other substance. The predetermined amount of coffee grounds and/or other substance and hot water may be combined in brewing chamber 110 when valve 120 is in the closed state, whereupon the coffee grounds and the water may mix, and the water may be infused by the coffee grounds; i.e. coffee may be brewed within brewing chamber 110. Plunger 117 may then be engaged with interior surface 111a of side wall 111 with air valve 118 in an open position. After a first predetermined amount of time has elapsed, motor 140 may be activated, thereby causing brewing chamber 110 to rotate at a selected rate of rotation. Valve 118 is preferably in a closed position during such rotation.

Rotation of brewing chamber 110 preferably causes a mixture of the water and coffee grounds to rotate at a desired rate, thereby causing separation of particulate matter and/or dissolved or suspended particles or compounds due to inertial force. Particularly, oils that separate from the coffee grounds during brewing preferably float on the surface of the water, while coffee bean particles above a predetermined size preferably accumulate proximate side wall 111, particularly proximate a lower portion thereof, such as in well 113b. After a second predetermined amount of time has elapsed, valve 120 may be manipulated to place valve 120 into the open state, whereafter the brewed coffee and oils, i.e. the liquid and dissolved or suspended particles or compounds smaller than the predetermined size, may pass through central opening 115. Air valve 118 may be closed and plunger 117 may be depressed relative to side wall 111 until a desired amount of the brewed coffee and oils have been evacuated and dispensed via spout 130. Separated coffee bean particles that accumulate proximate side wall 111 during rotation are preferably trapped in well 113b during depression of plunger 117, whereby the particles may not escape brewing chamber 110. Plunger 117 may then be raised and disengaged with side wall 111, whereafter each of plunger 117 and brewing chamber 110 may be removed for cleaning. After cleaning, brewing chamber 110 and plunger 117 may be reattached for subsequent use.

In a preferred embodiment, controller 160 is operable to automate the brewing process described above. For example, a user may specify the desired brewing time, volume, and particle size, and combine appropriate amounts of hot water and coffee grounds within brewing chamber 110 and press "brew" button 161. Controller 160 may then preferably cause plunger 117 to engage side wall 111 proximate an upper edge thereof to substantially seal brewing chamber 110. Then controller 160 may determine when the first predetermined amount of time has elapsed. Controller 160 may then cause motor 140 to rotate brewing chamber 110 at a predetermined rate. Then controller 160 may determine when the second predetermined amount of time has elapsed, whereafter controller 160 may cause valve 120 to open. Controller may then cause plunger 117 to move a predetermined distance toward bottom wall 113 relative to side wall 111, such as until plunger 117 abuts raised plateau 113a. Controller 160 may then cause motor 140 to stop rotating brewing chamber 110, and may disengage plunger 117 from sidewall 111, such as by raising plunger 117 a distance greater than a height of sidewall 111.

Figure 2:
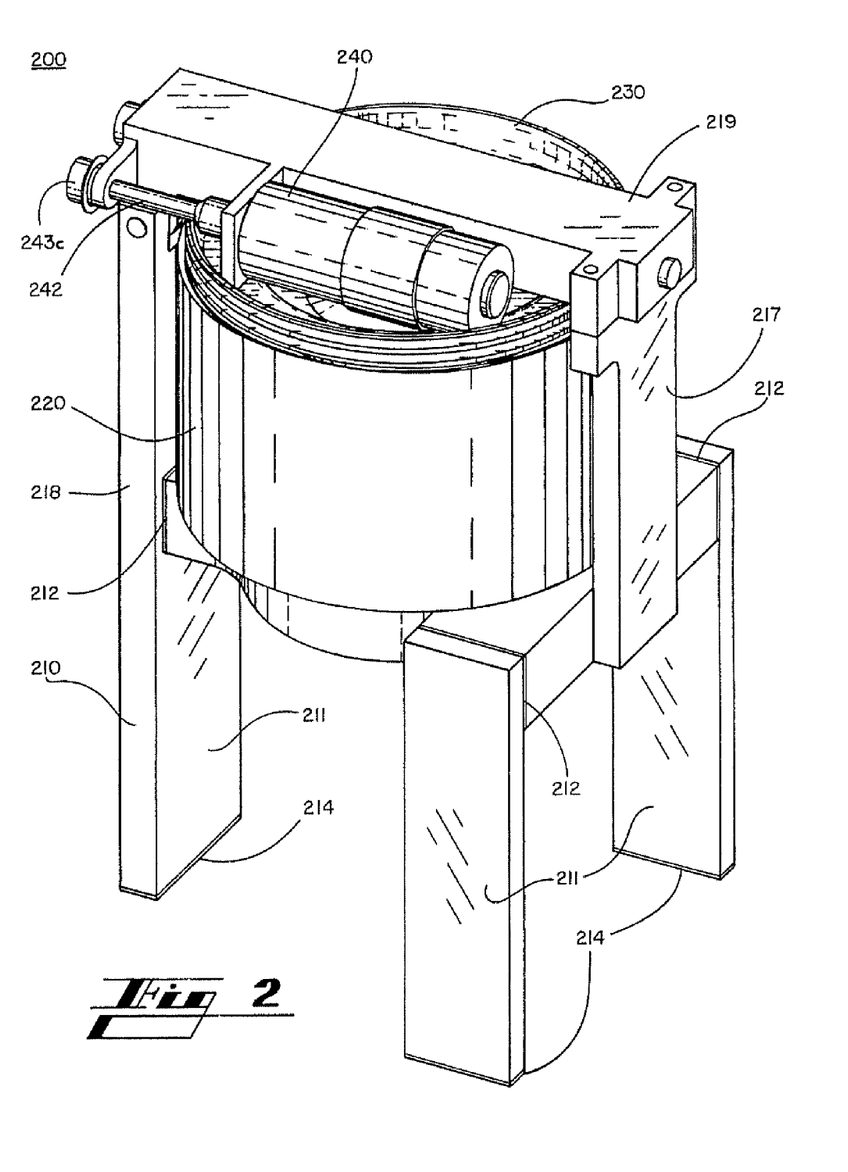
FIG. 2 is a perspective view of an alternate system for brewing beverages according to the present disclosure.
Figure 3:
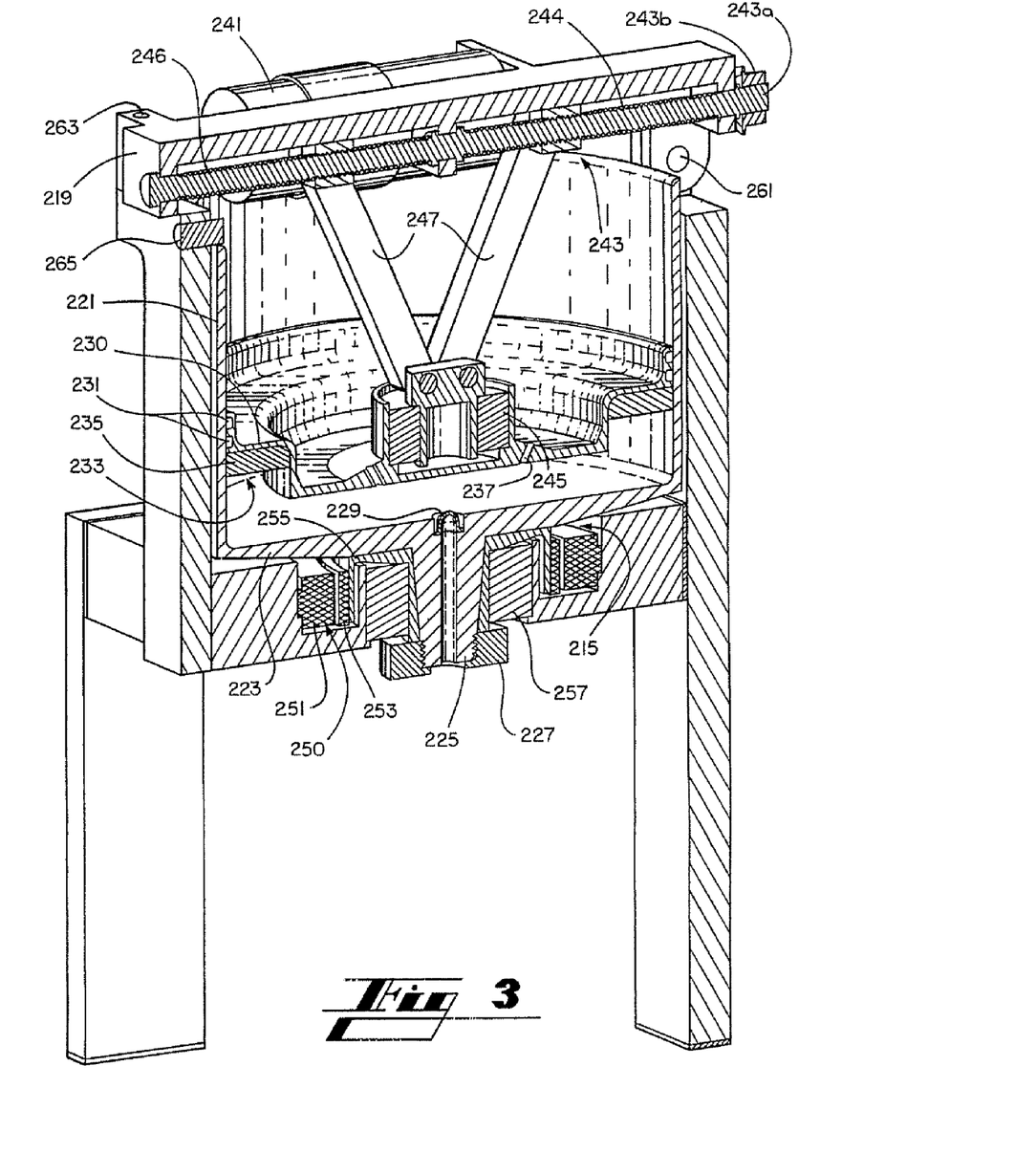
FIG. 3 is a cross-sectional perspective view of the system of FIG. 2.

Now referring to FIGS. 2 and 3, system 200 includes housing 210, rotatable brewing chamber 220, plunger 230, plunger drive 240, and chamber drive 250 adapted to brew beverages in a manner similar to that described above.

Specifically, housing 210 preferably includes a base, such as legs 211, and cavity 215 adapted to receive chamber drive 250 therein. Legs 211 may, optionally, include elastic gasket 212 and/or non-slip grips 214 in order to reduce vibration and/or to provide a secure support. Housing 210 preferably further includes arms 217 and 218 adapted to engage and support hinged beam 219. One or both of arms 217 and 218 may optionally include safety device 265 adapted to selectively prevent removal of brewing chamber 220 and/or plunger 230, as described in greater detail below. As will be understood by those ordinarily skilled in the art, legs 211 may be replaced by an enclosed base, or the like, if desired. Similarly, arms 217 and 218 and/or beam 219 may be replaced by or additionally include enclosing walls, baffles, or the like to prevent undesired contact of foreign bodies with chamber 220, unwanted ejection of debris or liquid, or the like.

Chamber drive 250 preferably comprises a frameless motor and may be mounted within cavity 215 according to conventional methods, whereby outer ring 251 and inner ring 253 may cause rotation of seat 255 operable with bearing 257. Specifically, seat 255 is supported by bearing 257 and carries inner ring 253 on a periphery thereof. Seat 255 preferably comprises a sloped inner aperture adapted to abuttingly receive tapered spout 225. Thus, chamber 220, including sidewall 221 and bottom 223 are preferably rotated via frictional engagement of spout 225 and seat 255. Spout 225 is preferably retained in frictional engagement with seat 255 via threaded nut 227, or other similar retaining member engaged with spout 225, or the like. Spout 225 preferably further includes a fluid conduit disposed generally centrally therethrough to selectively allow a beverage or the like to be dispensed from brewing chamber 220. Specifically, spout 225 preferably includes pressure-activated valve 229. As will be understood by those ordinarily skilled in the art, one or more of sidewall 221, bottom 223, and spout 225 may be separately formed and joined according to conventional techniques, or may be integrally formed by molding, casting, machining, or the like. Regardless of construction, however, sidewall 221, bottom 223, spout 225 and/or valve 229 preferably prevent unwanted leakage or escape of liquid from brewing chamber 220.

In order to further seal brewing chamber 220, especially during use, plunger 230 is preferably selectively engageable with sidewall 221 via one or more seal 231, such as one or more gasket or o-ring. Furthermore, plunger 230 preferably defines well 233 adapted to collect and trap particulate matter or the like, as discussed in greater detail below.

Well 233 is preferably configured to receive and retain an amount of particulate matter equal to or greater than an amount of particulate matter necessary to produce a quantity of beverage equal to the maximum capacity of brewing chamber 220. One or more shim or filler member 235 may be engaged with plunger 230 in order to reduce a volume of well 233, such as when a lesser quantity of beverage is desired, and a corresponding lesser amount of particulate matter is used. Additionally, plunger 230 may include one or more air valve 237 or the like, adapted to selectively allow and prevent air or other gas to escape brewing chamber 220 during depression and retraction of plunger 230 within brewing chamber 220, such as may occur during initial plunger engagement with brewing chamber 220 and during plunger retraction after beverage dispensing.

Plunger 230 is preferably movable within brewing chamber 220 via drive 240, including motor 241, transmission linkage 243, and bearing 245. More specifically, motor 241 preferably comprises an electric motor operable to rotate output shaft 242. Output shaft 242 is preferably operable with threaded shaft 243a via sheaves 243b and 243c and a cable, belt, chain, or the like (not shown). As will be understood by those ordinarily skilled in the art, gears or other force transmission means may be employed to convert a force generated by motor 241 to a force applied to threaded shaft 243a, and motor 241 may take the form of a hand crank, a hydraulic or pneumatic drive, or the like. Threaded shaft 243a preferably includes oppositely threaded portions 244 and 246 operable with arms 247. Thus, when motor 241 rotates output shaft 242, threaded shaft 243a rotates causing opposing motion of arms 247, i.e. motion of arms 247 towards one another or away from one another, thereby lowering or raising plunger 230, respectively.

Such raising of plunger 230 is preferably sufficient to completely disengage plunger 230 from brewing chamber 220, as shown in FIG. 2. In order for a user to open brewing chamber 220, such as for removal, cleaning, addition of water, addition of coffee, addition of tea, or the like, hinged beam 219 may be rotated upwardly about hinge 261, thereby exposing brewing chamber 220. Hinged beam 219 preferably further includes one or more releasable fastener 263, such as a clip, threaded fastener, or the like, adapted to selectively prevent rotation of hinged beam 219. Such releasable fastener 263 preferably locks hinged beam 219 in a use position, wherein lowering plunger 230 may create a pressure within brewing chamber 220, and wherein such lowering will not result in raising hinged beam 219.

In use, a beverage may be brewed by a user in brewing chamber 220 by first raising plunger 230 to a raised position, preferably disengaged with brewing chamber 220. Thereafter, the user may release releasable fastener(s) 263 and raise beam 219 to expose brewing chamber 220. The user may then combine a selected amount of liquid, such as water, corresponding to a desired amount of beverage along with a corresponding amount of substance to produce the beverage. Once combined, the user may close brewing chamber 220 by lowering beam 219, engaging releasable fastener(s) 263 and engaging plunger 230. As will be understood by those ordinarily skilled in the art, the brewing chamber may include volume indications for facilitating addition of the desired amount of water, or, more preferably, may include an integrated hot water dispenser adapted to dispense a selected amount of water at a selected temperature automatically. Additionally, the brewing chamber may include a heater to raise a temperature of the chamber to prevent or reduce cooling of the water upon introduction to the brewing chamber. After allowing a desired amount of time to pass, whereby the substance may steep in, or infuse the liquid, the user may engage safety 265 and begin rotating brewing chamber 220 at a desired rate. After rotation of brewing chamber 220 at the desired rate for a desired amount of time, whereafter particulate matter and compounds having a size, weight, or density above a predetermined threshold have substantially been separated and disposed proximate sidewall 221, the user may lower plunger 230 to force liquid out of brewing chamber 220 via valve 229 and spout 225. Preferably, valve 237 allows trapped air to escape therethrough during such lowering, but prevents liquid from escaping therethrough. Furthermore, during such lowering, substantially all separated particulate matter and/or compounds are trapped in well 233.

In order to clean system 200, or in order to brew more beverage, the user may raise plunger 230, wherein valve 237 and/or valve 229 preferably allows air to enter to reduce negative pressure caused by increasing the volume contained by brewing chamber 220 and plunger 230. After releasing safety 265, the user may disengage plunger 230 from sidewall 221. The user may then expose brewing chamber 220 via releasing fastener(s) 263 and raising beam 219. Nut 227 may then be disengaged from spout 225, whereafter chamber 220, including spout 225, may be disengaged from seat 255 for cleaning and reuse. As will be understood by those ordinarily skilled in the art, one or more of the foregoing steps may be accomplished via suitable control means, such as an electronic control device, a wireless control device, an automatic control device, or the like. Additionally, and particularly when a hot water dispenser is included, the brewing chamber may be rinsed without removal for cleaning.

Figure 4:
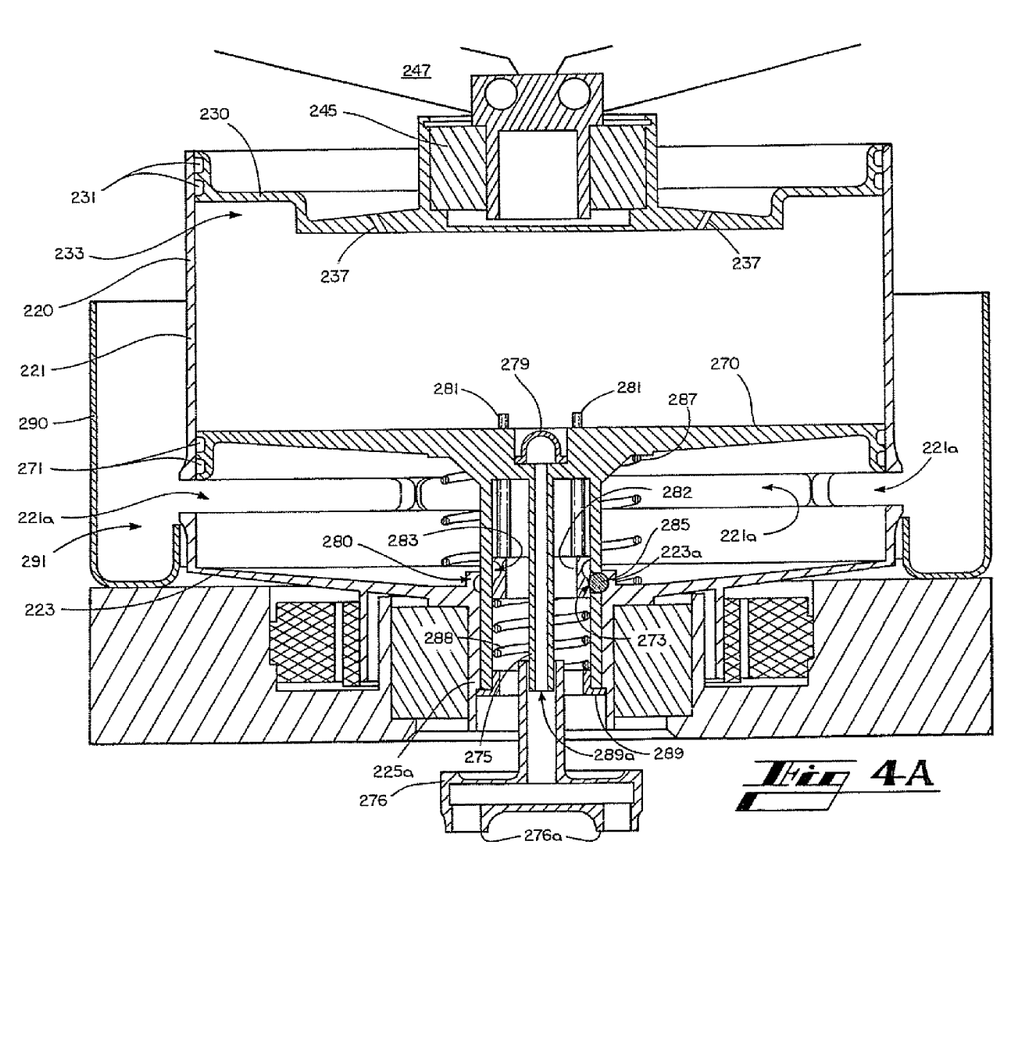
FIG. 4A is a cross-sectional view of another alternate system for brewing beverages according to the present disclosure in a first configuration.
FIG. 4B is a cross-sectional view of the system of FIG. 4A in a second configuration.
FIG. 4C is a cross-sectional view of the system of FIG. 4A in a third configuration.
Figure 4B:
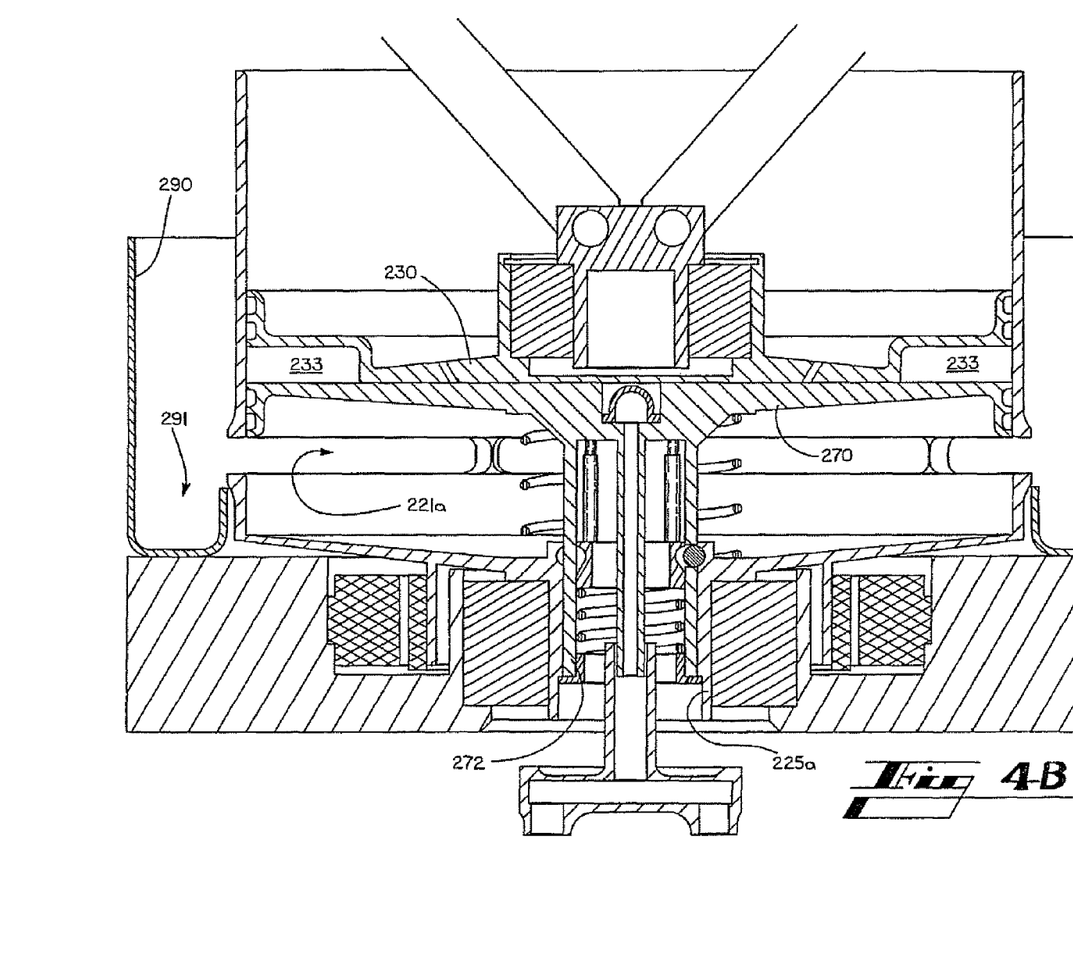
Figure 4C:
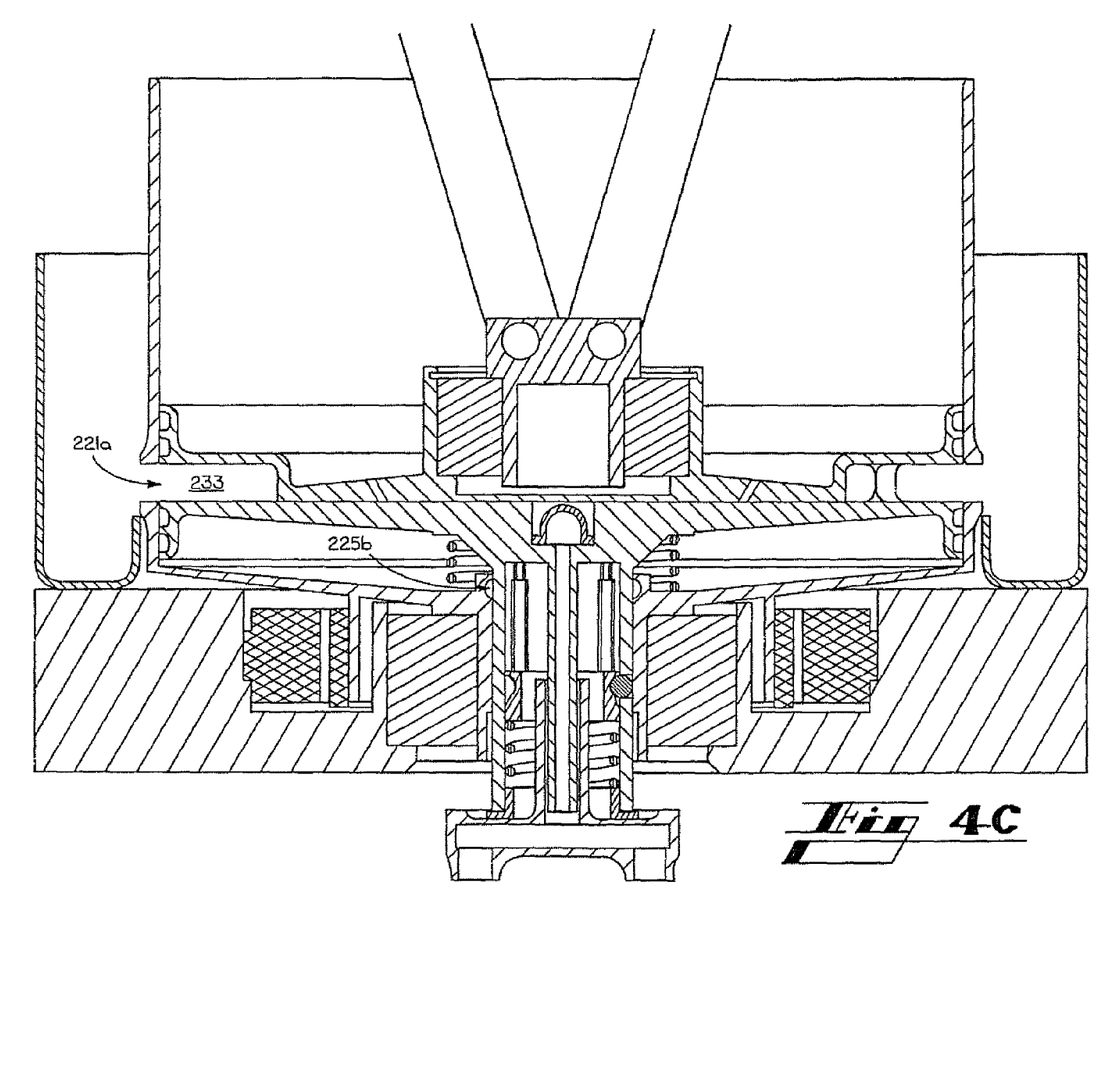

Now referring to FIGS. 4A-4C, system 200 may include an automatic cleaning feature, whereby coffee grounds or other particulate matter, or the like, collected in well 233 may be removed automatically. Additionally, if a water dispenser is included, the coffee grounds or other particulate matter may be rinsed out of well 233, thereby facilitating cleaning of system 200. Specifically, sidewall 221 of brewing chamber 220 may optionally include a plurality of apertures 221*a* disposed generally proximate bottom 223 for allowing such coffee grounds or the like to exit brewing chamber 220. Additionally, plunger 270, having seals 271 disposed about a circumference thereof, and depending stem 272 may be included within brewing chamber 220 and extending into and operable with stem 225*a* depending from bottom 223. Plunger 270 may further include spout 275, extending generally centrally from plunger 270 and within stem 272, for conducting fluid, such as a beverage, out from brewing chamber 220. Valve 279 operable with spout 275 may be included to control release of fluid from brewing chamber 220, such as described above with respect to valve 229.

In operation, brewing chamber 220 may be used to brew a beverage in the manner described above. That is to say, plunger 230 may be depressed to dispense a beverage from brewing chamber via valve 279 and spout 275 while trapping particulate matter within well 233 between plunger 230, plunger 270, and sidewall 221. As plunger 230 reaches and engages plunger 270, plunger 230 preferably releases lock 280, operable to selectively permit or prevent depression of plunger 270. Specifically, plunger 230 may depress pins 281 which in turn may depress ring 282 to align one or more depression(s) 283 with apertures 273 of stem 272, whereby beads 285 may move into depression(s) 283 to allow stem 272 to slide within stem 225*a*. Thus, when plunger 230 depresses pins 281, plunger 270 may be depressed under a force applied by plunger 230 (such as a force applied by motor 241) such that well 233 is disposed proximate openings 221*a* to allow particulate matter to exit well 233 via openings 221*a* and collect within trough 291 of collecting chamber 290.

When pins 281 are not depressed, however, sliding movement of stem 272 within stem 225*a* is substantially prevented by lock 280 by beads 285 disposed partially within one or more depression 225*b*. Biasing devices 287 and 288 may be provided to bias plunger 270 and pins 281 and ring 282 upwardly, whereby plunger 270 is sealingly engaged with sidewall 221 at a location above apertures 221*a* and with spout 275 locked within stem 225*a*. For example, biasing device 287 may be formed as a compression spring disposed against shoulder 223*a* of bottom 223 of chamber 220, or the like, and biasing device 288 may be formed as a compression spring disposed against retainer 289 engaged with stem 272 and having aperture 289*a* formed therethough to allow liquid to flow therethrough from spout 275. As will be understood by those ordinarily skilled in the art, collecting chamber 290 may be quickly and easily removed for cleaning and disposal of collected particulate matter. Additionally, trough 291 may be configured having a volume substantially greater than a volume of well 233.

Spout 276 may be included proximate aperture 289*a* to reduce any tangential velocity of the fluid exiting through aperture 289*a* to reduce spray and/or splashing of the fluid. Additionally, spout 276 may include two nozzles 276*a*, whereby fluid may be simultaneously dispensed into separate containers, or into a single container, as desired.

Having thus described exemplary embodiments of the present invention, it should be noted by those skilled in the art that the within disclosures are exemplary only and that various other alternatives, adaptations, and modifications may be made within the scope and spirit of the present invention. For example, the inertial separation techniques described above may be employed in conjunction with conventional mechanical separation techniques, if desired, and other methods of dispensing the beverage may be employed, such as extracting the beverage via a conduit penetrating the plunger under suction or solely due to pressure within the brewing chamber. Furthermore, axial rotation of the brewing chamber to accelerate the liquid is not necessary and may be replaced with other acceleration, such as rotation of an arm about a first end where the brewing chamber is connected to a second end of the arm. Similarly, other materials may be selected, such as forming the brewing chamber from a suitable ceramic material. Additionally, while the system has been described in the context of brewing beverages, non-brewed beverages may be prepared by separation of particulate matter from solution, such as with decanting wine, separating pulp from juice, or the like. Likewise, while the system has been described as a single brewing chamber unit, an industrial version may include a plurality of brewing chambers, each including associated motors, spouts, and controls, arranged within a common housing to enable brewing of greater quantities of beverage and/or different beverages simultaneously. A vending machine version is also contemplated wherein associated systems, such as a hot water dispensing system, automated brewing controls for water dispensing, rotation rate, and brewing duration, a coffee grinder and/or dispenser, and the like. Accordingly, the present invention is not limited to the specific embodiments as illustrated herein.

What is claimed is at least:

1. A system for brewing a beverage comprising:
    a rotatable brewing chamber operable to selectively contain a liquid;
    a prime mover operable to rotate said rotatable brewing chamber in a circular path of rotation; and
    a movable plunger operable to simultaneously reduce a volume of said rotatable brewing chamber and dispense liquid from said rotatable brewing chamber.

2. The system of claim 1, wherein said moveable plunger is engageable with a sidewall of said rotatable brewing chamber, said plunger being movable relative to said side wall to change an enclosed volume of said rotatable brewing chamber.

3. The system of claim 2, wherein said plunger comprises an operable valve to selectively allow passage of air through said plunger.

4. The system of claim 2, further comprising a second plunger engageable with said sidewall of said rotatable brewing chamber, said second plunger being movable relative to said side wall to further change the enclosed volume of said rotatable brewing chamber.

5. The system of claim 1, further comprising a spout having a valve operable to selectively seal an opening in said rotatable brewing chamber.

6. The system of claim 1, wherein said prime mover comprises:
    an electric motor and an output shaft coupled thereto, the electric motor having a control operable to change a rate of rotation of the output shaft of said electric motor.

7. The system of claim 1, further comprising a controller operable to selectively control a rate of rotation of said rotatable brewing chamber and to selectively allow liquid to flow from said rotatable brewing chamber to a spout.

8. The system of claim 1 wherein said rotatable brewing chamber is removable.

9. A system for brewing a beverage comprising:
a rotatable brewing chamber operable for combining a liquid and a particulate matter to generate an infused solution, the brewing chamber having at least one aperture for dispensing the infused solution therefrom and a collection area within said brewing chamber for collection of the particulate matter via centrifugal separation from the infused solution within the brewing chamber as the infused solution exits the at least one aperture.

10. The system of claim 9, further comprising a prime mover operable to rotate said brewing chamber.

11. The system of claim 9, further comprising a plunger operable to selectively seal said brewing chamber.

12. The system of claim 11, wherein said plunger is operable to increase an internal pressure of said brewing chamber to dispense the liquid.

13. The system of claim 9, wherein said collection area comprises a well spaced from said at least one aperture.

14. The system of claim 13, wherein said well is formed by at least one insert removably operable with said brewing chamber.

15. A device for brewing a beverage comprising:
a brewing chamber operable to selectively contain a liquid;
a prime mover configured to subject the liquid within said brewing chamber to a centrifugal force;
a region within said brewing chamber into which a particulate matter is directed by said centrifugal force created by said prime mover; and
a spout configured to facilitate the removal of the liquid from the brewing chamber without passage of the liquid through particulate matter contained within said region.

16. The device of claim 15 further comprising an axis of rotation about which said brew chamber is rotated by said prime mover.

17. The device of claim 16 wherein said brewing chamber is cylindrical.

18. The device of claim 17 wherein said region is adjacent a curved wall of said brewing chamber.

19. The device of claim 15 further comprising a movable plunger operable to simultaneously reduce a volume of said brewing chamber and dispense liquid from said brewing chamber.

* * * * *